US010345180B2

(12) United States Patent
Becher et al.

(10) Patent No.: US 10,345,180 B2
(45) Date of Patent: Jul. 9, 2019

(54) PRESSURE SENSOR

(71) Applicant: Endress + Hauser GmbH + Co. KG, Maulburg (DE)

(72) Inventors: Raimund Becher, Ehrenkirchen (DE); Anh Tuan Tham, Berlin (DE); Andreas Rossberg, Bad Sackingen (DE); Elke Schmidt, Bad Sackingen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 0 days.

(21) Appl. No.: 15/103,016

(22) PCT Filed: Nov. 14, 2014

(86) PCT No.: PCT/EP2014/074618
§ 371 (c)(1),
(2) Date: Jun. 9, 2016

(87) PCT Pub. No.: WO2015/090757
PCT Pub. Date: Jun. 25, 2015

(65) Prior Publication Data
US 2016/0305839 A1 Oct. 20, 2016

(30) Foreign Application Priority Data

Dec. 18, 2013 (DE) .................. 10 2013 114 407

(51) Int. Cl.
*G01L 19/14* (2006.01)
*G01L 9/00* (2006.01)
(52) U.S. Cl.
CPC .......... *G01L 19/142* (2013.01); *G01L 9/0075* (2013.01)

(58) Field of Classification Search
CPC ... G01L 9/0055; G01L 23/18; G01L 19/0645; G01L 9/0044; G01L 9/0072;
(Continued)

(56) References Cited

U.S. PATENT DOCUMENTS 4,262,540 A 4/1981 Tamai et al.
5,211,058 A 5/1993 Fukiura et al.
(Continued)

FOREIGN PATENT DOCUMENTS

CN 1662799 A 8/2005
CN 101512314 A 8/2009
(Continued)

OTHER PUBLICATIONS

English Translation of International Preliminary Report on Patentability, WIPO, Geneva, dated Jun. 30, 2016.
(Continued)

*Primary Examiner* — Harshad R Patel
*Assistant Examiner* — Brandi N Hopkins
(74) *Attorney, Agent, or Firm* — Bacon & Thomas, PLLC

(57) ABSTRACT

A pressure sensor comprising: a solid metal sensor body, having a front region and a base adjoining thereto, which has an outer edge, which can be clamped by means of a fastening device; a recess, which is provided in the front region and is open towards a front side of the front region that faces away from the base; a metal measuring diaphragm, to which a pressure is applied from outside during measurement operation and which can be deformed elastically depending upon the pressure, is arranged on the front side of the sensor body, closes off the recess from the outside, and is spaced apart from the outer edge of the front region; and an electromechanical transducer for detection, by means of measuring the pressure-dependent deformation of the measuring diaphragm, having at least one measuring element, which is
(Continued)

electrically insulated from the measuring diaphragm and the sensor body by means of an insulating element.

13 Claims, 3 Drawing Sheets

(58) Field of Classification Search
CPC . G01L 19/147; G01L 19/142; G01L 19/0092; G01L 19/0663; G01L 19/14; Y10T 29/49007; Y10T 29/43
USPC .................. 73/706, 718, 715, 708, 724, 756
See application file for complete search history.

(56) References Cited

U.S. PATENT DOCUMENTS

| | | | |
|---|---|---|---|
| 5,808,206 A | 9/1998 | Pandorf | |
| 5,877,424 A | 3/1999 | Hegner | |
| 5,939,639 A * | 8/1999 | Lethbridge | G01L 9/0072 361/283.3 |
| 6,490,932 B1 * | 12/2002 | Naegele | G01L 9/0044 73/715 |
| 6,606,912 B2 | 8/2003 | Ohmi | |
| 7,137,301 B2 * | 11/2006 | Grudzien | G01L 9/0072 73/718 |
| 7,793,534 B2 * | 9/2010 | Grosse Bley | G01M 3/205 204/424 |
| 8,033,179 B2 | 10/2011 | Lopatin | |
| 2001/0015105 A1 | 8/2001 | Gerst | |
| 2004/0155785 A1 * | 8/2004 | Okubo | B60C 23/0408 340/626 |
| 2004/0200286 A1 | 10/2004 | Mast | |
| 2006/0053893 A1 | 3/2006 | Banholzer | |
| 2006/0053896 A1 * | 3/2006 | Suzuki | G01L 19/0645 73/756 |
| 2006/0075823 A1 | 4/2006 | Grudzien | |
| 2007/0220989 A1 * | 9/2007 | Uchigashima | G01L 9/0042 73/756 |
| 2008/0253058 A1 | 10/2008 | Chakraborty | |
| 2009/0301210 A1 | 12/2009 | Becher | |

FOREIGN PATENT DOCUMENTS

| | | |
|---|---|---|
| DE | 2943800 A1 | 5/1980 |
| DE | 3121799 A1 | 12/1982 |
| DE | 4133008 A1 | 4/1992 |
| DE | 102006035230 A1 | 1/2008 |
| DE | 102010042421 A1 | 4/2012 |
| JP | H08219917 A | 8/1996 |
| JP | 9189630 A | 7/1997 |
| JP | 2000515967 A | 11/2000 |
| JP | 200150835 A | 2/2001 |
| JP | 2001296198 A | 10/2001 |

OTHER PUBLICATIONS

International Search Report,, EPO, The Netherlands, dated Feb. 9, 2015.
German Search Report, German PTO, Munich, dated Jan. 28, 2014.

* cited by examiner

PRESSURE SENSOR

TECHNICAL FIELD

The invention relates to a pressure sensor and a pressure measuring arrangement equipped with a pressure sensor.

BACKGROUND DISCUSSION

Pressure sensors are used in pressure measuring arrangements in almost all areas of industrial measurement technology to metrologically detect pressures to be measured.

For this purpose, so-called semiconductor sensors, such as pressure sensor chips based upon silicon, are often used today. These pressure sensors are, however, mechanically sensitive. For this reason, they cannot be exposed directly to the medium for which the pressure is to be measured. Instead, a diaphragm seal is provided upstream of the pressure sensor and transmits the pressure to be measured to the pressure sensor. Diaphragm seals are filled with a pressure-transmitting fluid, such as oil. Since the pressure-transmitting fluid freezes at low temperatures, these pressure sensors can only be used at temperatures that are far above the freezing point of the fluid used. The use of these pressure sensors is therefore limited to applications in which only temperatures above a minimum temperature dependent upon the selection of the fluid—generally above −70° C.—occur.

Extremely low temperatures below −70° C. occur in special applications, such as in systems for the liquefaction of natural gas, as well as in the transport of liquefied natural gases. In these cases, temperatures of down to −165° C. can occur.

Basically, therefore, for the measurement of pressures at temperatures below −70° C., only pressure sensors—often called dry sensors—that may be operated without the use of pressure-transmitting fluids are considered.

An example of dry pressure sensors are ceramic pressure sensors with a ceramic measuring diaphragm arranged on a cylindrical ceramic base body at a distance from said base body and having the same diameter as said base body. Ceramic pressure sensors offer the advantage that the ceramic measuring diaphragm can be exposed directly to the medium. In this respect, ceramics have particularly advantageous chemical and mechanical properties for application in pressure metrology. Ceramic pressure sensors must be installed at the location of use. To this end, they are regularly inserted into a sensor housing that is equipped with a process connection and in which an outer edge of the measuring diaphragm and base body is clamped in the axial direction, i.e., parallel to a surface normal to the measuring diaphragm. In order to avoid mechanical deformations within the pressure sensor, particularly in the area of the measuring diaphragm, the pressure sensors are clamped into the sensor housing by inserting intermediate elastomers. Elastomers, however, fail at the low temperatures mentioned. Accordingly, the use of these ceramic pressure sensors is also limited to temperatures above −70° C.

Another example of a dry pressure sensor is described in German Patent, DE 10 2006 035 230 A1. This pressure sensor comprises a sapphire carrier with piezoresistive silicon sensors mounted therein and interconnected to form a resistance bridge. The sapphire carrier is mounted on an inner surface of a titanium plate used as measuring diaphragm. During measurement operation, the pressure to be measured is directly applied to the outside of the titanium plate, and the plate's pressure-dependent bending is metrologically detected using the silicon sensors. The titanium plate is flush-mounted in a diaphragm carrier made of titanium, which in turn is inserted into a bracket that is made of a stainless steel and flush-mounted in a process connection made of a stainless steel. The diaphragm carrier is used to absorb stresses that may arise due to the different thermal expansion coefficients of the measuring diaphragm made of titanium and the bracket made of stainless steel, as well as of the process connection made of stainless steel. For this purpose, the diaphragm carrier comprises a circumferential annular recess on the inner surface facing the inside of the pressure sensor. The diaphragm carrier is thus able to protect the measuring diaphragm against deformations even in the case of rapid temperature changes. However, the carrier can do so only as long as it is itself still elastic enough due to the recess to absorb the forces caused by the different thermal expansions. These forces are all the larger, the lower the temperature is. In parallel, the lower the temperature is, the lower is the elasticity of titanium. The diaphragm carrier is thus less and less able to absorb these forces, the lower the temperature is at which it is used.

With dry pressure sensors, the distortion-free as possible mounting of the pressure sensor or the measuring diaphragm at the location of use at low temperatures poses significant problems.

SUMMARY OF THE INVENTION

It is a task of the invention to specify a pressure sensor, as well as a pressure measuring arrangement equipped with a pressure sensor, that can be used at low temperatures—in particular, at temperatures below −70° C.

To this end, the invention includes a pressure sensor comprising
   a solid metal sensor body having a front region and a base adjoining thereto,
      the front region of which has a larger cross-sectional area than the base, and
      the front region of which has an outer edge, which can be clamped by means of a fastening device to install the pressure sensor at a location of use,
   a recess, which is provided in the front region and which is open toward a front side of the front region that faces away from the base,
   a metallic measuring diaphragm, to which a pressure to be measured is applied from outside during measurement operation and which can be deformed elastically depending upon the pressure, is arranged on the front side of the sensor body, closes off the recess towards the outside,
      consists of the same metal as the sensor body, and
      is spaced apart from the outer edge of the front region, and
   an electromechanical transducer for metrologically detecting the pressure-dependent deformation of the measuring diaphragm, having at least one measuring element, which is electrically insulated from the measuring diaphragm and the sensor body by means of an insulating element.

According to a first development, a groove enclosing the measuring diaphragm on all sides is provided on the front side of the sensor body between the measuring diaphragm and the outer edge.

According to a second development, the front region comprises a metallic sealing lip of a metallic cutting ring seal on the front side of the outer edge, the sealing lip enclosing the measuring diaphragm on all sides, being spaced apart from the measuring diaphragm and protruding outward.

According to a third development, the measuring diaphragm consists of a metal—in particular, titanium, tantalum, a titanium alloy, or a tantalum alloy—having a percentage expansion greater than or equal to 10% in a temperature range that includes temperatures below −70° C. and in which the pressure sensor may be used—in particular, in a temperature range from −165° C. to −70° C.

According to an embodiment of the invention or the third development, the insulating element consists of a material—in particular, of ceramics or sapphire—which has a thermal expansion coefficient adapted to the thermal expansion coefficient of the metal of the sensor body and the measuring diaphragm in a temperature range that includes temperatures below −70° C. and in which the pressure sensor may be used—in particular, in a temperature range from −165° C. to −70° C.

According to a first variant of the invention,
the insulating element is a body, which is inserted into the recess and which, in particular, is anchored in the recess by means of an active hard solder joint and the front side of which is facing the measuring diaphragm, runs parallel to the measuring diaphragm, and is spaced apart from it, and
one of the measuring elements is a measuring electrode mounted to the front side of the insulating element, said measuring electrode, together with the measuring diaphragm serving as a counter electrode, forming a capacitor having a capacity that depends upon the pressure-dependent bending of the measuring diaphragm.

According to one embodiment of the first variant,
the insulating element has, on its front side that faces the measuring diaphragm, a wave profile forming a diaphragm bed for the measuring diaphragm and consisting of waves that are arranged concentrically to the center of the measuring diaphragm, and
the measuring diaphragm is designed as a wave diaphragm having a wave profile that has the same shape as the wave profile of the insulating element and that is, in particular, produced by impressing the measuring diaphragm on the diaphragm bed.

According to a second variant of the invention,
the insulating element is a disk that is arranged on an inner surface of the measuring diaphragm facing the inside of the recess and is laminarly joined with the measuring diaphragm, and
the measuring elements are sensors—in particular, piezoresistive silicon sensors—inserted into the insulating element on the side of the insulating element that faces away from the measuring diaphragm.

According to a preferred embodiment of the second variant,
the insulating element consists of sapphire, and
the laminar joint of the insulating element and the measuring diaphragm is a hard solder joint.

According to a fourth development of the invention,
at least one contact connected to at least one of the measuring elements is provided on the side of the insulating element that faces away from the measuring diaphragm,
a connecting line is connected to each contact,
a bore, which passes through the base and ends in the recess, is provided in the sensor body for each connecting line,
a small duct made of an insulating material—in particular, of ceramics or sapphire—is inserted into each bore and lines the bore, and
each connecting line is fed through one of the small ducts.

According to one embodiment of the fourth development, each of the connecting lines is connected to the associated contact by means of soldering or bonding.

According to a fifth development, the electromechanical transducer is connected via at least one connecting line to an electronic component—in particular, to an electronic component equipped with a heater—that is arranged at a distance to the measuring diaphragm.

Furthermore, the invention comprises a pressure measuring arrangement with a pressure sensor according to the invention, having
a connecting element—in particular, a connecting pipe, a connecting piece, or a connecting flange—
which has a central recess exposing the measuring diaphragm, and
a fastening device for attaching the pressure sensor to the connecting element,
which exclusively rests upon the outer edge of the front region of the pressure sensor, and which, in particular, exclusively exerts forces on the edge that act parallel to the surface normal to the measuring diaphragm.

Furthermore, the invention comprises an embodiment of the pressure measuring arrangement according to the invention with a pressure sensor according to the second development, in which
the connecting element has a metallic sealing contour, which is complementary to the sealing lip of the sensor body, in an area opposite the sealing lip,
a metallic seal—in particular, a seal coated on the outside with a coating of polytetrafluoroethylene—made of a more ductile metal—in particular, of gold or copper—than the metal of the sealing lip and the sealing contour, is arranged between the sealing lip and the sealing contour, and
the fastening device comprises a sleeve, which is slid onto the pressure sensor from the side that faces away from the measuring diaphragm and which is connected to the connecting element by means of a screw connection.

Moreover, the invention comprises an alternative embodiment of the pressure measuring arrangement according to the invention, in which
the connecting element comprises an annular circumferential groove on its front side opposite the outer edge, and
an annular circumferential sealing spring, —in particular, a sealing spring with a c-shaped cross-sectional profile—made of a resilient metal—in particular, of a metal coated on the outside with a coating of polytetrafluoroethylene—is inserted into the groove, and
the fastening device comprises a sleeve, which is slid onto the pressure sensor from the side that faces away from the measuring diaphragm and which is connected to the connecting element by means of a screw connection.

The pressure sensors according to the invention offer the advantage that the measuring diaphragm and the sensor body are made of the same metal and that the pressure sensor may be installed at the location of use by axial clamping of the outer edge of the front region of the solid sensor body, which is spaced apart from the measuring diaphragm. In this way, it is possible to use the pressure sensor at low temperatures—in particular, at temperatures in the range of −165° C. to −70° C.—without the measurement being impaired at these temperatures as a result of deformations in the area of the measuring diaphragm caused by the clamping of the pressure sensor.

BRIEF DESCRIPTION OF THE DRAWINGS

The invention and its advantages will now be explained in detail using the figures in the drawing, which show three examples of embodiments. The same elements are indicated by the same reference numbers in the figures.

DETAILED DISCUSSION IN CONJUNCTION WITH THE DRAWINGS

Figure 1:
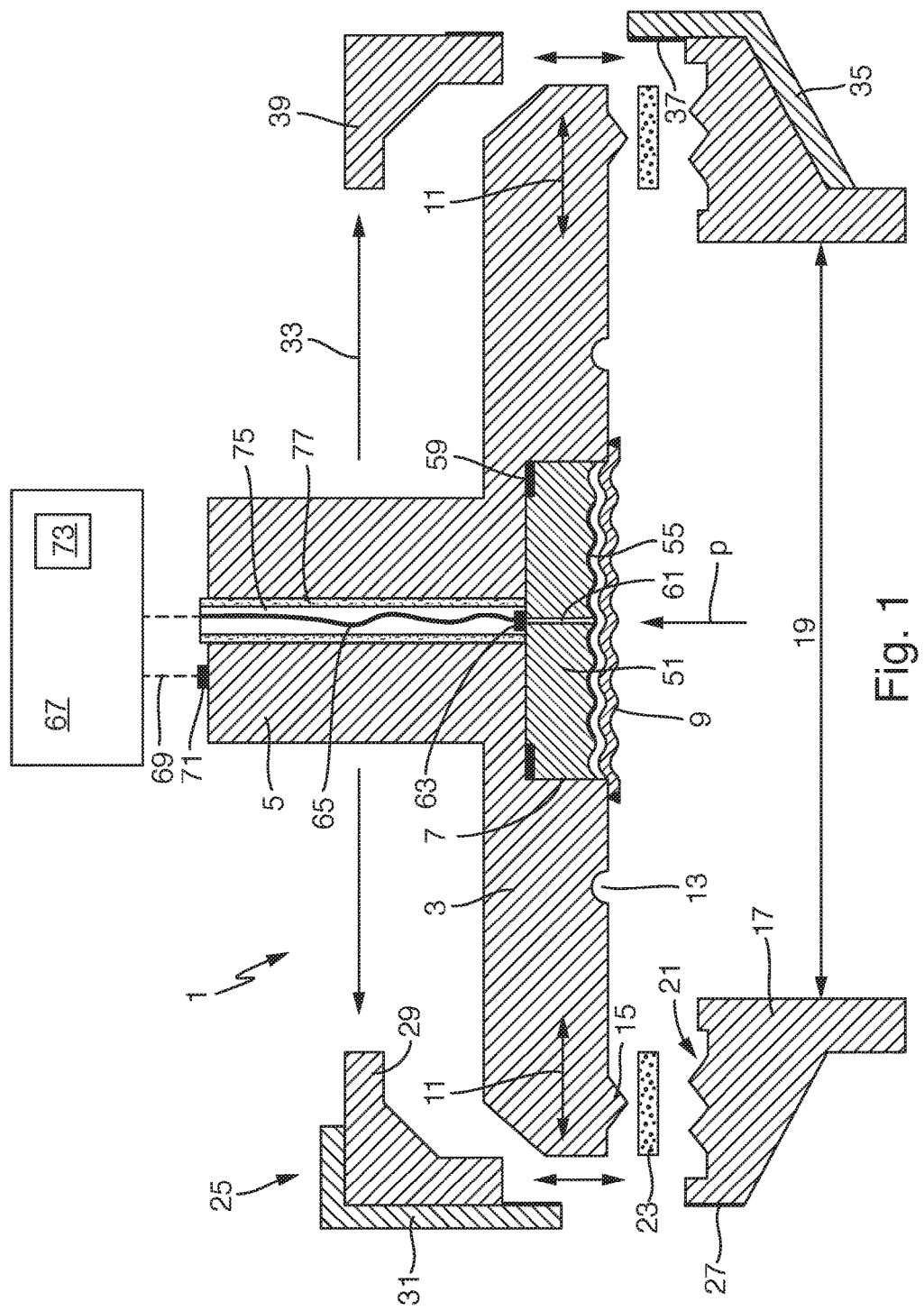
FIG. 1 shows: a pressure measuring arrangement with a pressure sensor with a capacitive electromechanical transducer.

FIG. 1 shows a cross section through an exploded view of a pressure measuring arrangement with a pressure sensor according to the invention. The pressure sensor comprises a solid metal sensor body 1, having a front region 3 and a base 5, which is adjoining thereto and which runs parallel to the longitudinal axis of the pressure sensor. The front region 3 has the basic shape of a disk, through the center of which the longitudinal axis of the pressure sensor runs.

In the front region 3 of the sensor body 1 is provided a recess 7, which is open toward a front side of the front region 3 facing away from the base 5 and which is flush with the front side of the sensor body 1.

On the front side of the pressure sensor is arranged a metallic measuring diaphragm 9, which can be deformed elastically depending upon the pressure and which completely covers the recess 7 and closes it off toward the outside. Here, an outer edge of the measuring diaphragm 9, which encloses the recess 7 on the outside, is connected to the front side of the sensor body 1 by a joint, e.g., an electron beam weld.

In order that the measuring diaphragm 9 can be elastically deformed to a sufficient degree even at low temperatures below −70° C.—in particular, in a temperature range of −165° C. to −70° C.—a metal is used, which has a sufficiently high elasticity, a sufficiently high yield strength, and a sufficiently high percentage expansion in this temperature range. The percentage expansion ε denotes the proportion of the change in length that occurs in a body under tensile stress in relation to its initial length and is thus the decisive variable of the bending of the measuring diaphragm 9 to be detected metrologically.

Whereas the elasticity modulus and yield strength of the named metals increase with decreasing temperature, and are non-critical in this respect, the percentage expansion ε decreases with decreasing temperature. Preferably, a metal is used, which has a percentage expansion ε that is greater than or equal to 10% in the temperature range in which the pressure sensor is to be used. In this respect, austenitic stainless steels, titanium, titanium alloys, as well as tantalum and tantalum alloys are suitable as material for the measuring diaphragm 9. Preferably, the measuring diaphragm 9 consists of titanium or a titanium alloy.

A preferred metal is titanium with the degree of purity 2 (grade 2 titanium). Grade 2 titanium has a percentage expansion ε that is greater than or equal to 18% at temperatures above or equal to −165° C. A measuring diaphragm made of grade 2 titanium with a diameter of 15 mm and a comparably large thickness of 0.4 mm experiences an elastic bending, in which the center of the measuring diaphragm is deflected by more than 10 μm, when a pressure of 1 MPa (10 bar) is applied at −165° C. Since diaphragm deflections on the order of magnitude of a few micrometers—in particular, more than 2 μm—can already be metrologically detected, a bending of this order of magnitude can be readily detected metrologically.

In order to avoid deformations of the measuring diaphragm 9 caused by different thermal expansion coefficients, the solid sensor body 1 consists of the same metal as the measuring diaphragm 9. In this way, no deformations caused by thermal expansion occur between the measuring diaphragm 9 and the sensor body 1, even if the pressure sensor passes through a very wide temperature range.

In addition, joints between identical materials are of a higher quality and more mechanically resistant across the temperature range than joints between different materials.

During measurement operation, a pressure p to be measured is applied to an exterior side of the measuring diaphragm 9 facing away from the recess 7, and its pressure-dependent deformation is detected by means of an electromechanical transducer. To this end, the pressure sensor is installed at the location of use in such a way that even at low temperatures—in particular, at temperatures below −70° C.—no deformations impairing the measurement occur in the area of the measuring diaphragm 9.

For this purpose, the front region 3 of the solid sensor body 1 has a significantly larger cross-sectional area than the base 5 adjoining thereto, and the front region 3 comprises an outer edge 11—illustrated in the figures with double arrows—which is spaced apart from the measuring diaphragm 9.

This has the effect that the pressure sensor can be installed in a pressure measuring arrangement at the location of use by means of a fastening device, by exclusively clamping the outer edge 11 of the front region 3, which is spaced apart from the measuring diaphragm 9. For this purpose, the fastening device is designed such that it acts exclusively on the outer edge 11 and exerts forces on this that preferably act exclusively parallel to the surface normal to the measuring diaphragm 9.

The force exerted on the pressure sensor by the fastening device is thus limited to the outer edge 11 of the front region 3, which is spaced apart from the measuring diaphragm 9. This offers effective protection of the measuring diaphragm 9 against deformations. In doing so, the spatial distance between the measuring diaphragm 9 and the clamped outer edge 11 of the front region 3 already causes a mechanical decoupling. This is all the more effective, the thicker the front region 3 is, and the further the edge Ills spaced from the measuring diaphragm 9.

The decoupling of the measuring diaphragm 9 from the mechanical clamping of the outer edge 11 of the pressure sensor can be even further improved by providing a groove 13, which encloses the measuring diaphragm 9 on the outside on all sides, on the front side of the front region 3.

In this way, the pressure sensors according to the invention can be used at temperatures below −70° C., without the measurement being impaired at these temperatures as a result of deformations of the measuring diaphragm 9 caused by the clamping of the pressure sensor.

In order to achieve a pressure-tight clamping of the outer edge 11 of the pressure sensor at low temperatures by means of the fastening device, a metallic sealing lip 15 of a metallic cutting ring seal is provided on the front side of the outer edge 11 of the front region 3 of the sensor body 1, said sealing lip preferably protruding outward, parallel to the longitudinal axis of the pressure sensor. The sealing lip 15 encloses the measuring diaphragm 9 on all sides and is spaced apart from the measuring diaphragm 9.

The pressure measuring arrangement comprises a connecting element 17—in particular, a connecting pipe, a connecting piece, or a connecting flange—on which the pressure sensor is mounted by means of the fastening device. The connecting element 17 has a central recess 19, which exposes the measuring diaphragm 9 and via which the pressure p to be measured is applied to the measuring diaphragm 9 during measurement operation. In addition, the connecting element 17 has a metallic sealing contour 21, which is complementary to the sealing lip 15 of the sensor body 1, on its front side opposite the sealing lip 15. For this purpose, the sealing lip 15 and the complementary sealing contour 21 may have profiles like the ones used in vacuum technology for cutting ring seals. Between the sealing lip 15 of the sensor body 1 and the complementary sealing contour 21 of the connecting element 13, a metallic seal 23 is inserted, which is made of a more ductile metal than the metal of the sealing lip 15 and the sealing contour 21. Suitable for this purpose is, in particular, a seal 23 made of gold or copper. In order to improve the sealing effect of the cutting ring seal at extremely low temperatures, the seal 23 is preferably provided on the outside with a coating of polytetrafluoroethylene.

The fastening device is designed such that it presses the outer edge 11 of the front region 3 of the sensor body 1 against the connecting element 17. This has the effect that the sealing lip 15 and the sealing contour 21 cut into the metallic seal 23 clamped between them.

Suitable as a fastening device that acts exclusively on the outer edge 11 of the sensor body 1 is, in particular, a sleeve 25, which is slid onto the pressure sensor from the side that faces away from the measuring diaphragm 9 and which, in the mounted state, rests on an outer edge of the rear side, facing away from the measuring diaphragm 9, of the outer edge 11 of the front region 3 and can be connected to the connecting element 17—for example, by means of a screw connection, here indicated by a double arrow. The sleeve 25 is, for example, a sleeve nut that is screwed onto an external thread 27 of the connecting element 17. This variant is shown in the left half of FIG. 1. In order to protect the sensor body 1 against rotatory forces exerted by the screwing process, the sleeve nut preferably has an insert 29, which rests directly on the sensor body 1 and over which a bushing 31 having the internal thread is placed. The insert 29 preferably consists of the same metal as the sensor body 1. Preferably, the bushing 31 and at least an area of the connecting element 17 that adjoins the sensor body 1 in the mounted state also consists of this metal. Deformations occurring across the temperature range and caused by different thermal expansion coefficients are thereby excluded.

The sleeve 25 has a central bore 33, through which the base 5 runs and the cross-sectional area of which is large enough that the sleeve 25 rests exclusively on the outer edge 11 of the front region 3 in the mounted state.

Alternatively, the connecting element 17 can be equipped with a sleeve nut 35, which has an internal thread 37 and which is screwed onto a sleeve 39, which is slid onto the sensor body 1 from a side facing away from the measuring diaphragm 9, and which has an external thread. This variant is shown in the right half of the pressure measuring arrangement of FIG. 1. The sleeve 39—exactly like the insert 29—is slid onto the sensor body 1 from a side facing away from the measuring diaphragm 9 and also has a central bore 33, through which the base 5 runs and the cross-sectional area of which is large enough that the sleeve 39 rests exclusively on the outer edge 11 of the front region 3 in the mounted state.

Alternatively, the sleeve and the connecting element can also be designed as flanges, which are screwed together by means of bolt screws that pass through their outer edges.

Figure 2:
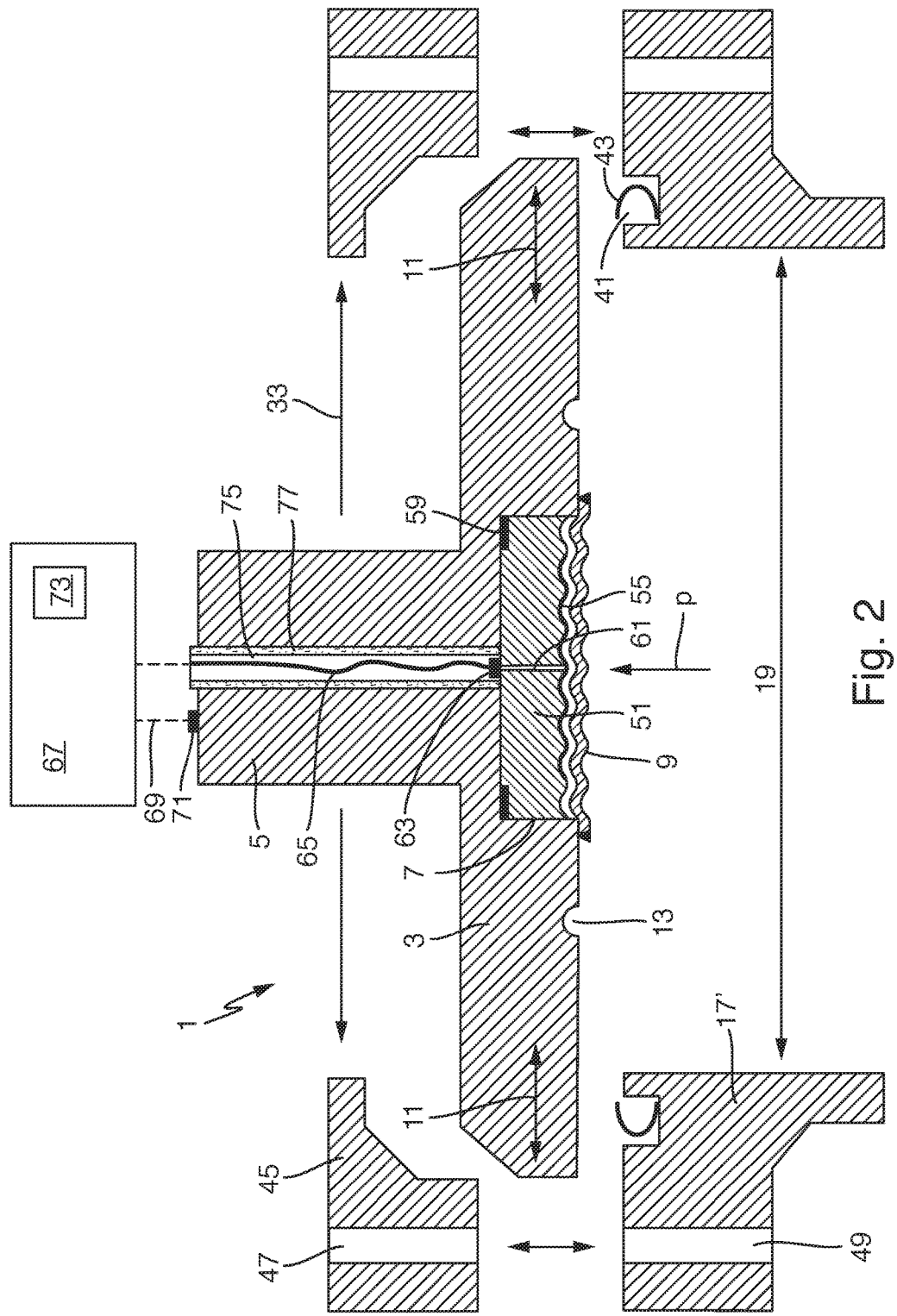
FIG. 2 shows: another pressure measuring arrangement with the pressure sensor of FIG. 1.

Instead of the pressure-tight fastening by means of a cutting ring seal shown in the measuring arrangement of FIG. 1, other sealing principles that are suitable for use at low temperatures may also be used. One example of this is shown in FIG. 2. The measuring arrangement shown there comprises a pressure sensor that is different from the pressure sensor shown in FIG. 1 only in that it does not have a sealing lip. The pressure measuring arrangement shown in FIG. 2 also comprises a connecting element 17', which comprises a central recess 19 exposing the measuring diaphragm 9 and on which the pressure sensor is mounted by means of the fastening device. The connecting element 17' has, on its front side opposite the outer edge 11 of the front region 3, an annular circumferential groove 41, into which an annular circumferential sealing spring 43 made of a resilient metal is inserted. The sealing spring 43 has a c-shaped cross-sectional profile, for example, and protrudes from the groove 41 in the decompressed state. Just like the seal 23 of FIG. 1, the sealing spring 43 is also preferably provided on the outside with a coating of polytetrafluoroethylene.

Here, the fastening device is also designed such that it presses the outer edge 11 of the front region 3 of the sensor body 1 against the connecting element 17' parallel to the surface normal to the measuring diaphragm 9. The planar front side of the outer edge 11, which faces the connecting element 17', is thereby pressed against the sealing spring 43. The sealing spring 43 is thereby tensioned and has its sealing effect. In order to have an optimal sealing effect in as wide a temperature range as possible, the sealing spring 43 preferably consists of a metal that has a thermal expansion coefficient that is identical or at least very similar to the thermal expansion coefficient of the connecting element 17' and the sensor body 1. Preferably, the area, comprising the groove 41, of the connecting element 17', the sensor body 1, and the sealing spring 43 consists of titanium or a titanium alloy.

Here, the fastening device also comprises a sleeve 45, which rests exclusively on the outer edge 11 of the front region 3 in the mounted state and which can be connected with the connecting element 17' by means of a screw connection, indicated here by a double arrow. In contrast to the exemplary embodiment shown in FIG. 1, the sleeve 45 and the connecting element 17' are here designed in the shape of a flange. Accordingly, the screw connection is here made by bolt screws (not shown in FIG. 2), by means of which the sleeve 45 and the connecting element 17' are screwed together. For this purpose, the sleeve 45 as well as the connecting element 17' have continuous bores 47, 49, which are arranged on their outer edges and through which the bolt screws pass in the mounted state.

Alternatively, the connection of the connecting element 17' and the sleeve 45 can also be made by means of the screw connections shown in FIG. 1.

During measurement operation, the measuring diaphragm 9 is exposed to the pressure p to be measured via the connecting element 17 or 17'. This pressure p causes a pressure-dependent elastic deformation of the measuring diaphragm 9, which is metrologically detected by means of the electromechanical transducer and converted into an electrical signal.

Figure 3:
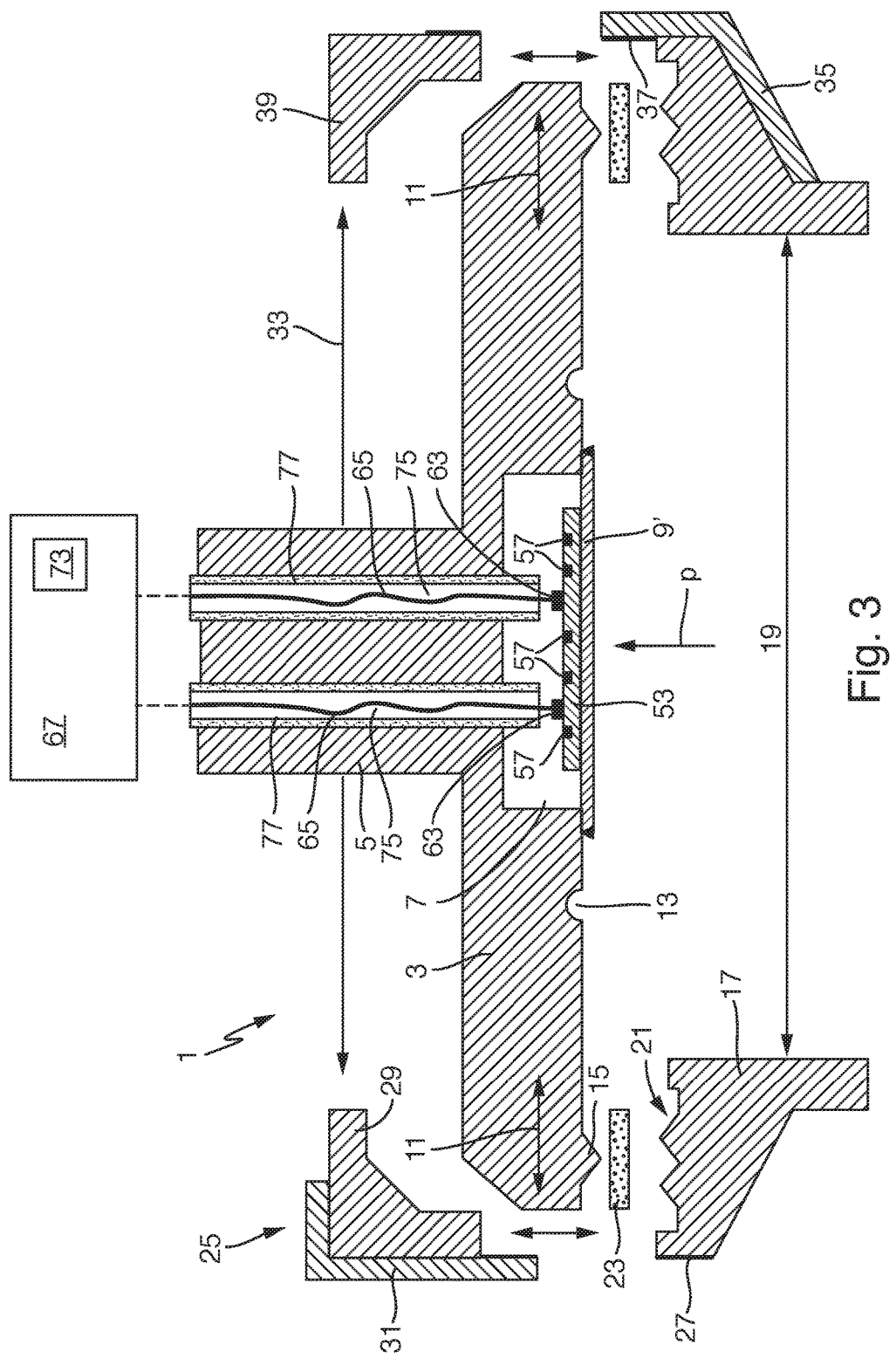
FIG. 3 shows: a pressure measuring arrangement with a pressure sensor with a piezoresistive electromechanical transducer.

In the exemplary embodiments shown in FIG. 1 and FIG. 2, a capacitive electromechanical transducer is provided for this purpose. FIG. 3 shows an alternative exemplary embodiment, in which a transducer equipped with an expansion measuring element is provided.

In both cases, the transducer comprises an insulating element 51, 53 and at least one electrically insulated measuring element 55, 57, which is insulated by the insulating element 51, 53 from the metallic measuring diaphragm 9, 9' and the sensor body 1 electrically conductively connected to it via a purely metallic joint. The insulating element 51 or 53 consists of an electrically insulating material which has a thermal expansion coefficient that is adapted to the thermal expansion coefficients of the sensor body 1 and the measuring diaphragm 9, 9' in the temperature range in which the pressure sensor can be used. To this end, a material is selected the thermal expansion coefficient of which is as similar as possible at these temperatures to that of the metal. In connection with titanium or tantalum, as well as titanium or tantalum alloys, as material for the sensor body 1 and the measuring diaphragm 9, ceramics and sapphire are suitable for this purpose.

Titanium, tantalum, as well as titanium and tantalum alloys, have thermal expansion coefficients on the order of magnitude of $8\times10^{-6}$ per ° C. at temperatures in the range of $-165°$ C. to $-70°$ C. Sapphire has a thermal expansion coefficient on the order of magnitude of $6\times10^{-6}$ per ° C. in this temperature range.

As ceramics, it is preferable to use glass ceramics made of mica crystals and borosilicate glass. An example in this respect are glass ceramics offered by the company EuropTec under the brand name of MACOR, which contain silicon dioxide, magnesium oxide, aluminum oxide, potassium oxide, boron oxide, and fluorine. These have a thermal expansion coefficient in the range of $7.4\times10^{-6}$ per ° C. in the temperature range of $-200°$ C. to $-25°$ C. and, in addition, offer the advantage that they can be produced with low production tolerances by machining, have a high surface quality, do not emit any gases due to the fact that they are free of pores, can be coated using metals, and can be hard soldered.

Sapphire and ceramics are mechanically stable and provide good electrical insulation even at temperatures below $-70°$ C.—in particular, at temperatures in the range of $-165°$ C. to $-70°$ C.

By using titanium, tantalum, as well as titanium or tantalum alloys, for the sensor body 1 and the measuring diaphragm 9 in connection with insulating elements 51, 53 made of sapphire or ceramics, it is possible to use the pressure sensor in a temperature range of down to $-165°$ C.

Sapphire or ceramics can be used as material for the insulating elements 51 or 53 in connection as well with a sensor body 1 and a measuring diaphragm 9 made of austenitic stainless steel. Austenitic stainless steels, however, have a thermal expansion coefficient on the order of magnitude of $16\times10^{-6}$ per ° C., so that a significantly worse adaptation than with the other named metals here exists, limiting the lower bound of the temperature range in which the pressure sensor can be used. Since tantalum and tantalum alloys are expensive compared to titanium and titanium alloys, the measuring diaphragms 9, 9' and the sensor body 1 preferably consist of titanium or a titanium alloy and are used in connection with an insulating element 51, 53 made of sapphire or ceramics.

In the capacitive transducer shown in FIG. 1, the insulating element 51 is a body, which is inserted into the recess 7 and anchored at its rear side facing away from the measuring diaphragm 9. This body has a front side, which faces the measuring diaphragm 9, runs parallel to the measuring diaphragm 9, and is spaced apart from it. To this end, the insulating element 51 anchored on the rear side has a height that is less than the height of the recess 7.

The anchoring preferably takes place by means of a joint 59 produced by an outer edge of the rear side of the insulating element 37, which faces the base 5, and the bottom area of the recess 7, which is opposite the insulating element 37 and is formed by the sensor body 1. Active hard solder joints, in particular, are suitable for joining metal—especially, titanium—and ceramics, or sapphire. For this purpose, a ternary active hard solder is preferably used, which comprises a Zr—Ni alloy and titanium. Such an active hard solder is described in EP 0 490 807 B1, for example.

The insulating element 51 preferably comprises a circumferential recess along a closed outer edge on its rear side facing the base 5, into which recess a soldering ring made of the active hard solder is inserted. The soldering ring is inserted into the recess 7 together with the insulating element 51, where it is then in direct contact with the bottom area of the recess 7, and is there soldered.

The measuring elements 55 of the capacitive transducer are electrodes, which are arranged on the front side of the insulating element 51 facing the measuring diaphragm 9. These electrodes are electrically insulated from the measuring diaphragm 9, due to their distance to the measuring diaphragm 9, and from the sensor body 1 by the insulating element 51. One of the measuring elements 55 is a measuring electrode, which, together with the measuring diaphragm 9 serving as a counter electrode, forms a capacitor having a capacity that depends upon the pressure-dependent bending of the measuring diaphragm 9. Additional electrodes (not shown here), such as reference electrodes, may also be provided on the insulating element 51. The measuring electrode is, for example, an electrode that is applied—for instance, by sputtering—onto the front side of the insulating element 51 as a metallic coating. Preferably, the electrodes consist of a metal, the thermal expansion coefficient of which is as similar as possible to the thermal expansion coefficient of the insulating element 51. Since the material of the insulating element 51 is selected depending upon the thermal expansion coefficient of the metal of the sensor body 1, the electrodes preferably consist of the same metal as the sensor body 1—preferably of titanium.

The electrical connection of the measuring elements 55 takes place via contact pins 61, which are fed through the insulating element 51 and which connect each measuring element 55 with an associated contact 63 arranged on the rear side of the insulating element 51 facing away from the measuring diaphragm 9. The contact pins 61 may be, for example, titanium or tantalum pins. Tantalum has a thermal expansion coefficient that is very similar to that of titanium and of the insulating element 51.

Each contact 63 is connected via an electrical connecting line 65 to an electronic component 67, which is arranged at a distance from the measuring diaphragm 9, determines the pressure p to be measured during measurement operation based upon the pressure-dependent bending of the measuring diaphragm 9, 9' detected metrologically by the transducer, and displays this pressure p or provides it in the form of an appropriate output signal. For this purpose, the connecting lines 65 are connected, for example, by means of soldering or bonding to the contacts 63.

In the exemplary embodiment shown in FIG. 1, an electrical connection 69 of the counter electrode formed by the measuring diaphragm 9 to the electronic component 67 is additionally provided. Since the metallic measuring diaphragm 9 is electrically conductively connected to the metallic sensor body 1, the connection 69 of the counter electrode is made, for example, via a contact 71 applied to a front side of the base 5 facing away from the measuring diaphragm 9.

To the extent possible, based upon the conditions at the location of use and the resulting required length of the connecting lines 65, the electronic component 67 is to be arranged at such a distance from the measuring diaphragm 9, 9' that it is located at the location of use at a place that is warm enough for the operation of the electronic component 67. Electronic components can typically be used only at temperatures above −40° C. The length of the connecting lines 65 of transducers that are operated without on-site electronic components arranged directly on the transducer is typically limited to lengths on the order of magnitude of 10 cm. If a temperature gradient along the connecting lines 65 of 10° C./cm is assumed, the measuring diaphragm 9, 9' can be subjected to temperatures above −140° C. with a line length of 10 cm. In order to be able to also use the pressure sensor with lower temperature gradients, shorter line lengths, or lower temperatures prevailing at the measuring diaphragm 9, 9', the electronic component 67 is preferably equipped with a heater 73.

For each connecting line 65, a bore 75, which passes through the base 5 to the recess 7 and in which the respective connecting line 65 is run to the associated contact 63, is provided in the sensor body 1. In order to electrically insulate the connecting lines 65 from the sensor body 1, each bore 75 is lined with a small duct 77 made of an electrically insulating material. The small ducts 77 preferably consist of a material that has a thermal expansion coefficient adapted to the thermal expansion coefficient of the metal of the sensor body 1. Preferably, the same material is used here as for the insulating elements 51 or 53.

Whereas the measuring diaphragm is preferably designed as a planar measuring diaphragm for measuring lower pressures—for example, on the order of magnitude of 1 MPa (10 bar)—the measuring diaphragm 9 is preferably designed as a wave diaphragm for measuring in higher pressure measurement ranges—for example, for measuring pressures on the order of magnitude of up to 10 MPa (100 bar). This variant is shown in FIG. 1. For this purpose, the area of the measuring diaphragm 9, which covers the recess 7 and is preferably in the shape of a circular disk, has a wave profile of waves arranged concentrically to the center of the measuring diaphragm 9. A wave diaphragm offers the advantage at high pressures that it is stiffer than a disk-shaped diaphragm of the same material thickness and that the pressure-dependent bending of a wave diaphragm has a more linear dependency upon the pressure p acting on it than a disk-shaped measuring diaphragm.

In this case, the front side of the insulating element 51 facing the wave diaphragm is preferably designed as a diaphragm bed for the wave diaphragm, which diaphragm bed supports the measuring diaphragm 9 in case of an excessive load acting on it. To this end, the front side of the insulating element 51 facing the measuring diaphragm 9 has the same wave profile as the measuring diaphragm 9 arranged above it.

The wave profile of the measuring diaphragm 9 is preferably produced such that a planar metallic disk made of the material of the measuring diaphragm 9 is welded onto the front side of the sensor body 1 and is at least once impressed there onto the wave profile of the insulating element 51. For this purpose, a pressure is applied to the metal disk, continuously increased up to an impressing pressure, where the shape of the insulating element 51 is impressed onto the metallic disk, and maintained at this impressing pressure for a period of time. As soon as the impressing pressure is subsequently no longer applied to the measuring diaphragm 9, the impressed measuring diaphragm 9 bounces from the diaphragm bed to a location at a distance from the insulating element 51, due to the measuring diaphragm's own restoring force.

The pressure measuring arrangement shown in FIG. 3 differs from the exemplary embodiment shown in FIG. 1 only in the design of the electromechanical transducer and the shape of the measuring diaphragm 9'. In contrast to the previous exemplary embodiments, the insulating element 53 of the transducer is here applied directly to an inner surface of the measuring diaphragm 9' facing the inside of the recess 7.

In the process, measuring elements 57 are inserted into the insulating element 53 on its side facing away from the measuring diaphragm 9'. The measuring elements 57 are, for example, elongation resistances—in particular, piezoresistive elements—which are, for example, interconnected to form a resistance measuring bridge.

For this purpose, transducer chips known from the silicon on sapphire technology can be used with a sapphire carrier and silicon sensors enclosed therein. Sapphire has a crystalline structure compatible with the crystalline structure of silicon and ensures good insulation of the enclosed silicon sensors, even at low temperatures.

Here, the sapphire carrier forms the disk-shaped insulating element 53, which insulates the measuring elements 57 from the measuring diaphragm 9'. The insulation of the measuring elements 57 from the sensor body 1 is achieved by the measuring elements being arranged in the recess 7 at a distance from the material of the sensor body 1. Here, the electrical connection of the transducer is also made via connecting lines 65, which are connected to contacts 63 arranged on the side of the insulating element 53 facing away from the measuring diaphragm 9'. The connecting lines 65 are also here fed through bores 75, which are lined with small ducts 77 made of an insulating material and pass through the sensor body 1. In contrast to the previous exemplary embodiment, the small ducts 77, however, preferably here extend into the recess 7.

In order to achieve an optimal transmission of the pressure-dependent bending of the measuring diaphragm 9' to the measuring elements 57 inserted into the insulating element 53, the disk-shaped insulating element 53 is preferably laminarly joined with the measuring diaphragm 9'. To this end, the measuring diaphragm 9' is preferably designed as a planar metal disk. The laminar joint is achieved, for example, by hard soldering.

The insulating element 53 attached to the measuring diaphragm 9' stiffens the measuring diaphragm 9'. Accordingly, the pressure sensor shown in FIG. 3 is preferably used to measure higher pressures p. Alternatively, the stiffening may be compensated by selecting a material having a higher percentage expansion ε for the measuring diaphragm 9'. Since the percentage expansion ε decreases with falling temperatures, this does, however, regularly result in an increase in the lower bound of the temperature range, in which the pressure sensor can be used.

The invention claimed is:

1. A pressure sensor, comprising:
   a solid metal sensor body having a front region and a base adjoining thereto, said front region of having a larger cross-sectional area than said base, and said front region of having an outer edge, that is clamped by means of a fastening device to install the pressure sensor at a location of use;
   a recess provided in said front region and open toward a front side of said front region that faces away from said base;
   an insulating element;
   a metallic measuring diaphragm, to which a pressure to be measured is applied from outside during a measurement operation and which can be deformed elastically depending upon the pressure, is arranged on the front side of said sensor body, and closes off said recess towards the outside, said metallic measuring diaphragm consists of the same metal as said sensor body, and is spaced apart from the outer edge of said front region; and
   an electromechanical transducer for metrologically detecting the pressure-dependent deformation of said metallic measuring diaphragm, having at least one measuring element, which is electrically insulated from said metallic measuring diaphragm and said sensor body by means of said insulating element,
   wherein said insulating element is a body, which is inserted into said recess and which, in particular, is anchored in said recess by means of an active hard solder joint and the front side of which is facing said measuring diaphragm, runs parallel to said measuring diaphragm, and is spaced apart from it; and one of said measuring elements is a measuring electrode mounted to the front side of said insulating element, said measuring electrode, together with said measuring diaphragm serving as a counter electrode, forming a capacitor having a capacity that depends upon the pressure-dependent bending of said measuring diaphragm, and
   wherein said insulating element has, on the front side that faces said measuring diaphragm, a wave profile forming a diaphragm bed for said measuring diaphragm and consisting of waves that are arranged concentrically to the center of said measuring diaphragm; and said measuring diaphragm is designed as a wave diaphragm having a wave profile that is the same as the wave profile of said insulating element and that is, in particular, produced by impressing said measuring diaphragm on the diaphragm bed.

2. The pressure sensor according to claim 1, wherein:
   on the front side of said sensor body between said measuring diaphragm and said outer edge, a groove enclosing said measuring diaphragm from all sides is provided.

3. The pressure sensor according to claim 1, wherein:
   said front region on said front side of said outer edge has a metallic sealing lip of a metallic cutting ring seal, which encloses said measuring diaphragm from all sides, is spaced apart from said measuring diaphragm, and protrudes outwards.

4. The pressure sensor according to claim 1, wherein:
   said the measuring diaphragm consists of a metal—in particular, titanium, tantalum, a titanium alloy, or a tantalum alloy—having a percentage expansion ($\varepsilon$) greater than or equal to 10% in a temperature range that includes temperatures below −70° C. and in which the pressure sensor may be used—in particular, in a temperature range from −165° C. to −70° C.

5. The pressure sensor according to claim 1, wherein:
   said insulating element consists of a material—in particular, of ceramics or sapphire—which has a thermal expansion coefficient adapted to the thermal expansion coefficient of the metal of said sensor body and said measuring diaphragm in a temperature range that includes temperatures below −70° C. and in which the pressure sensor may be used—in particular, in a temperature range from −165° C. to −70° C.

6. The pressure sensor according to claim 1, further comprising:
   an electric component, wherein:
   said electromechanical transducer is connected via at least one connecting line to said electronic component—in particular, to an electronic component equipped with a heater—that is arranged at a distance to said measuring diaphragm.

7. A pressure measuring arrangement with a pressure sensor according to claim 1, comprising:
   a connecting element—in particular, a connecting pipe, a connecting piece, or a connecting flange;
   which has a central recess exposing said measuring diaphragm; and
   a fastening device for attaching the pressure sensor to said connecting element, said fastening device exclusively rests on the outer edge of the front region of the pressure sensor, and which, in particular, exclusively exerts forces on the edge that act parallel to the surface normal to said measuring diaphragm.

8. The pressure measuring arrangement according to claim 7, with a pressure sensor having said front region on said front side of said outer edge has a metallic sealing lip of a metallic cutting ring seal, which encloses said measuring diaphragm from all sides, is spaced apart from said measuring diaphragm, and protrudes outwards;
   said connecting element has a metallic sealing contour, which is complementary to said sealing lip of said sensor body, in an area opposite said sealing lip;
   a metallic seal—in particular, a seal coated on the outside with a coating of polytetrafluoroethylene—made of a more ductile metal—especially, of gold or copper—than the metal of said sealing lip and the sealing contour, is arranged between said sealing lip and said sealing contour; and
   said fastening device comprises a sleeve, which is slid onto said pressure sensor from the side that faces away from said measuring diaphragm and which is connected to said connecting element by means of a screw connection.

9. The pressure sensor arrangement according to claim 7, wherein:
   said connecting element comprises an annular circumferential groove on its front side opposite said outer edge, and
   an annular circumferential sealing spring, in particular, a sealing spring with a c-shaped cross-sectional profile; made of a resilient metal—especially, of a metal coated on the outside with a coating of polytetrafluoroethylene—is inserted into the groove; and
   said fastening device comprises a sleeve, which is slid onto the pressure sensor from the side that faces away from said measuring diaphragm and which is connected to said connecting element by means of a screw connection.

10. A pressure sensor, comprising:

a solid metal sensor body having a front region and a base adjoining thereto, said front region of having a larger cross-sectional area than said base, and said front region of having an outer edge, that is clamped by means of a fastening device to install the pressure sensor at a location of use;

a recess provided in said front region and open toward a front side of said front region that faces away from said base;

an insulating element;

a metallic measuring diaphragm, to which a pressure to be measured is applied from outside during a measurement operation and which can be deformed elastically depending upon the pressure, is arranged on the front side of said sensor body, and closes off said recess towards the outside, said metallic measuring diaphragm consists of the same metal as said sensor body, and is spaced apart from the outer edge of said front region; and an electromechanical transducer for metrologically detecting the pressure-dependent deformation of said metallic measuring diaphragm, having at least one measuring element, which is electrically insulated from said metallic measuring diaphragm and said sensor body by means of said insulating element, wherein:

said insulating element is a disk that is arranged on an inner surface of said measuring diaphragm facing the inside of said recess and that is laminarly joined with said measuring diaphragm; and said measuring elements are sensors—in particular, piezoresistive silicon sensors—inserted into said insulating element on the side of said insulating element that faces away from said measuring diaphragm.

11. The pressure sensor according to claim 10, wherein:

said insulating element consists of sapphire; and the laminar joint of said insulating element and said measuring diaphragm is a hard solder joint.

12. A pressure sensor, comprising:

a solid metal sensor body having a front region and a base adjoining thereto, said front region of having a larger cross-sectional area than said base, and said front region of having an outer edge, that is clamped by means of a fastening device to install the pressure sensor at a location of use;

a recess provided in said front region and open toward a front side of said front region that faces away from said base;

an insulating element;

a metallic measuring diaphragm, to which a pressure to be measured is applied from outside during a measurement operation and which can be deformed elastically depending upon the pressure, is arranged on the front side of said sensor body, and closes off said recess towards the outside, said metallic measuring diaphragm consists of the same metal as said sensor body, and is spaced apart from the outer edge of said front region; and an electromechanical transducer for metrologically detecting the pressure-dependent deformation of said metallic measuring diaphragm, having at least one measuring element, which is electrically insulated from said metallic measuring diaphragm and said sensor body by means of said insulating element, further comprising:

at least one contact connected to at least one of said measuring elements on the side of said insulating element that faces away from said measuring diaphragm;

a connecting line is connected to each contact;

a bore, which passes through said base and ends in said recess in said sensor body for each connecting line;

a small duct made of an insulating material—in particular, of ceramics or sapphire—is inserted into each bore and lines the bore; and each connecting line is fed through one of said small ducts.

13. The pressure sensor according to claim 12, wherein:

each said connecting line is respectively connected by means of soldering or bonding to an associated contact.

* * * * *